United States Patent
Michaluk, III

[19]

[11] Patent Number: 5,961,243
[45] Date of Patent: Oct. 5, 1999

[54] KIT ASSEMBLY FOR CONSTRUCTING AN ARTICLE OF FURNITURE

[76] Inventor: Mitchell W. Michaluk, III, 17501 Mulvaney, Manchester, Mich. 48158

[21] Appl. No.: 08/987,168

[22] Filed: Dec. 8, 1997

[51] Int. Cl.[6] .............................. B25G 3/00; F16B 9/00; A47F 5/13
[52] U.S. Cl. ...................... 403/260; 403/408.1; 403/256; 403/347; 211/189; 211/182
[58] Field of Search ................................... 403/260, 256, 403/257, 259, 261, 21, 230, 258, 408.1, 263, 346, 347; 411/396, 383, 373, 376; 248/224.8, 225.11; 312/140, 257.1, 265.4, 265.1; 211/189, 182, 191; 5/288, 9.1, 201; 256/65

[56] References Cited

U.S. PATENT DOCUMENTS

| | | |
|---|---|---|
| 3,851,981 | 12/1974 | Corsi et al. . |
| 4,012,157 | 3/1977 | Krause et al. ............................ 403/21 |
| 4,146,342 | 3/1979 | Cederholm . |
| 4,148,106 | 4/1979 | Gallien . |
| 4,189,976 | 2/1980 | Becker ................................ 411/396 X |
| 4,261,470 | 4/1981 | Dolan .................................. 211/182 X |
| 4,456,299 | 6/1984 | Steinmetz . |
| 4,511,108 | 4/1985 | Ponzellini . |
| 4,701,065 | 10/1987 | Orosa ....................................... 403/263 |
| 4,893,958 | 1/1990 | Wieland . |
| 4,979,281 | 12/1990 | Smith et al. ..................... 403/408.1 X |
| 5,069,506 | 12/1991 | Wieland . |
| 5,277,476 | 1/1994 | Caldwell . |
| 5,363,625 | 11/1994 | Philippi ............................... 403/260 X |
| 5,681,135 | 10/1997 | Simonson ................................... 411/5 |

FOREIGN PATENT DOCUMENTS 1399355  4/1965  France .................................. 403/347

*Primary Examiner*—Lynne Reichard
*Assistant Examiner*—John R. Cottingham
*Attorney, Agent, or Firm*—Gifford, Krass, Groh, Sprinkle, Anderson & Citkowski, P.C.

[57] ABSTRACT

A kit assembly for constructing an article of furniture and including a first plurality of vertically extending and elongate supports which are arranged in spaced apart fashion and a second plurality of horizontally extending and elongate cross members. Opposite ends of the elongate cross members are received within appropriately formed apertures in the vertically extending supports and additional apertures extend in cross wise and communicating fashion through the vertical supports as well as the inserted and aligning ends of the cross members. Bolt fasteners are inserted through the additional and cross wise extending apertures in both the selected vertical supports and cross members and an intermediate portion of each fastener includes an annular and outwardly angled step which, upon insertion of the bolt fastener, corresponds both in axial placement and annular dimension to an inward and angularly extending ledge of a spool shaped aperture in the cross member. A nut and washer arrangement threadably engages an oppositely projecting end of the selected bolt fastener and the nut is rotated in a tightening direction so as to generate angularly directed contact forces between the annular steps of the fastener and the spool shaped aperture and so that the cross member is fixedly secured to the vertical support.

11 Claims, 5 Drawing Sheets

KIT ASSEMBLY FOR CONSTRUCTING AN ARTICLE OF FURNITURE

BACKGROUND OF THE INVENTION

1. Field of the Invention

The present invention relates generally to furniture assemblies and fastener systems for assembling articles of furniture and, more particularly, to an improved and modular kit assembly which utilizes prefabricated members and fasteners for versatile construction of an article of furniture according to a wide variety of shapes and sizes.

2. Description of the Prior Art

Knock-down furniture assemblies and related fastener systems for use with such assemblies are well known in the art. The objective in each instance is to provide a type of prefabricated furniture assembly which can quickly be assembled together, such types of furniture commonly including chairs, shelving units, tables and the like.

A number of attempts have been made in the prior art to provide an effective fastening means for a knock-down furniture assembly and examples of such devices are shown in U.S. Pat. No. 5,069,506, issued to Wieland, U.S. Pat. No. 4,511,108, issued to Ponzellini, U.S. Pat. No. 4,146,342, issued to Cederholm, and U.S. Pat. No. 4,148,106, issued to Gallien. In each instance, the prior art teaches a fairly sophisticated variation of an interconnecting fastener for use with prefabricated furniture members for securing together the members in some structural manner. It is however submitted that none of the referenced prior art overcomes the shortcoming of failing to provide an improved and simplified assembly device which is capable of establishing a secure and enduring connection between prefabricated structural members.

SUMMARY OF THE PRESENT INVENTION

The present invention is a kit assembly for constructing an article of furniture in modular and versatile fashion and which can have many different shapes and sizes. A first plurality of elongate and vertically extending supports are arranged in spaced apart fashion. The vertical supports each are substantially square shaped in cross section with a first pair of spaced apart faces and a second pair of spaced apart faces. A first plurality of substantially rectangular cross sectional shaped apertures with rounded corners extend in individual and alternating fashion through the first pair of spaced apart faces and the second pair of spaced apart faces along the longitudinal length of each of the vertical supports. A second plurality of circular cross sectional shaped apertures likewise individually extend through the second pair of spaced apart faces and the first pair of spaced apart faces in longitudinally spaced and reverse alternating fashion with respect to the first rectangular shaped apertures. The first and second apertures are accordingly arrayed in cross wise and communicating fashion with respect to one another.

A second plurality of elongate and horizontally extending cross members are provided and are shaped similar in cross section to the first plurality of rectangular shaped apertures with the exception of its rounded corners having a sharper radius of curvature as compared to those of the rectangular shaped apertures and such that opposite ends of the cross members may be inserted within selected rectangular apertures of the spaced apart vertical supports. Additional circular cross sectional shaped apertures are arranged at the opposite inserting ends of the cross members and, upon inserting the cross members within the selected vertical supports, are positioned in alignment between a pair of selected circular cross sectional shaped apertures which are separated by a selected cross wise extending rectangular shaped aperture in the vertical support. Each of the apertures formed in the cross members are according to a generally spool shape which define annular extending and inwardly angled ledges and which communicate with a central and interior aperture which is selected according to a diameter less than a diameter of the pair of circular apertures arrayed on the opposite sides thereof.

A plurality of individual fastener assemblies are provided and each include a bolt having a circular cross sectional and threaded shaft and an enlarged head portion secured to one end of the shaft. The shafts are dimensioned that they may be inserted through an aligned arrangement established between a selected cross member and vertical support and an intermediate portion of the bolt shaft includes an annular and outwardly angled step which, upon application of the bolt, establishes an abutting engagement with the inserted cross member. A threaded nut is rotatably secured over an extending end portion of the threaded shaft and, upon tightening, results in the creation of outwardly and angularly extending gripping forces between the opposing and abutting annular steps in the cross member and bolt and which, in combination with the inward and axial force applied by the threaded nut, precludes the incidence of looseness or wobble being established between the interconnected members.

According to a further preferred embodiment, both the cross sectional shape of the horizontal cross members and the first apertures in the vertical supports are configured as multiple-sided polygons. The purpose of this configuration takes into account expansion and contractions of interengaging wooden members and to prevent wobble in the furniture over extended time.

A third plurality of horizontally extending enclosure members are provided in alternating fashion relative to the horizontally extending cross members and may be secured at opposite ends to selected vertical supports to add to enclose one or more of the sides established by the skeletal framework of the vertical supports and horizontal cross members of a prefabricated furniture assembly to be constructed. One or more planar shaped and rigid platforms are also capable of being supported upon selected cross members as desired.

BRIEF DESCRIPTION OF THE DRAWINGS

Reference will now be made to the attached drawings, when read in combination with the following specification, wherein like reference numerals refer to like parts throughout the several views, and in which.

DETAILED DESCRIPTION OF THE PREFERRED EMBODIMENTS

Figure 1:
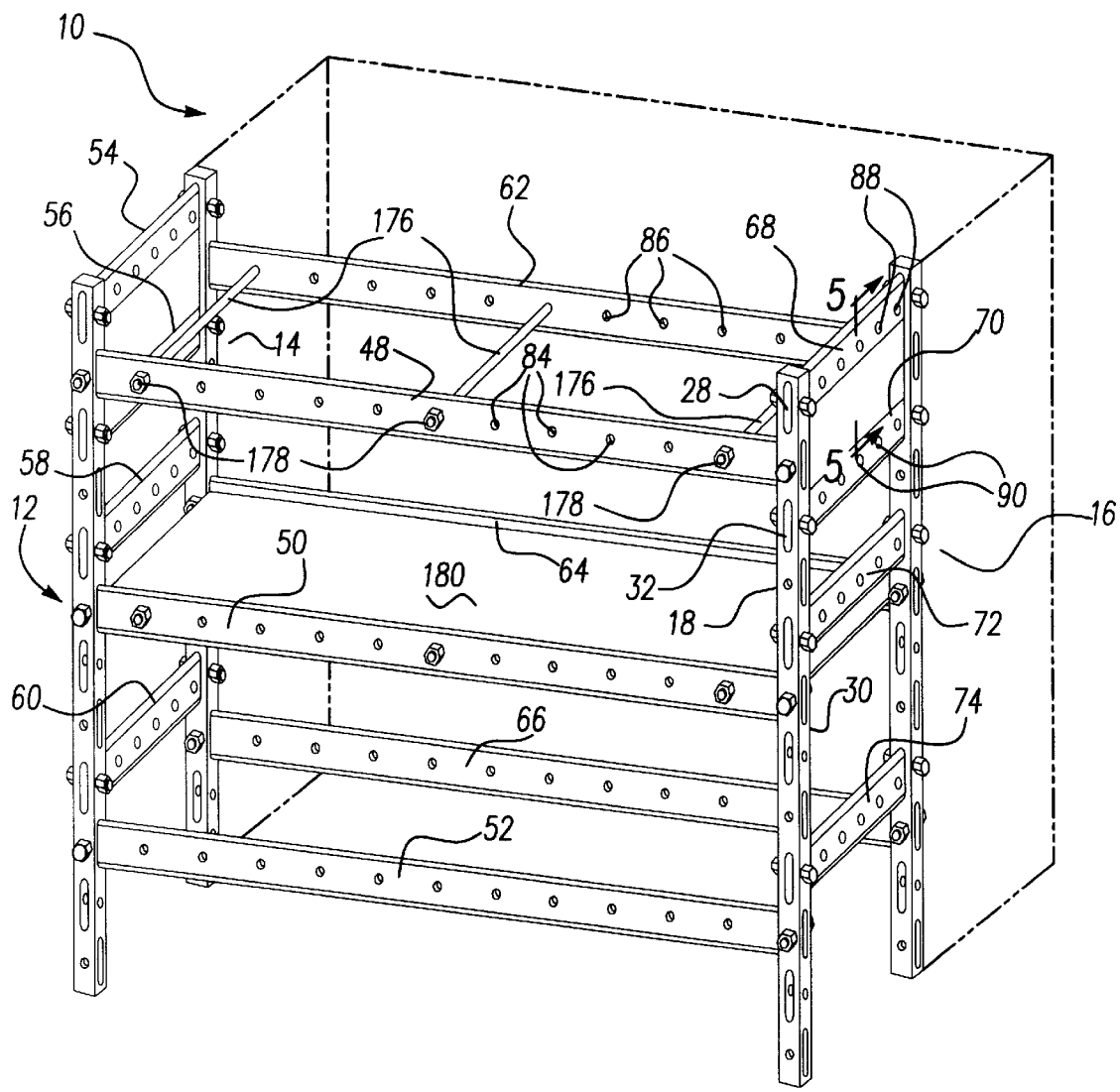
FIG. 1 is a perspective view of a kit assembly for constructing an article of furniture according to a first preferred embodiment of the present invention.

Referring now to FIG. 1, a kit assembly is illustrated at 10 for constructing an article of furniture from prefabricated members. The types of articles of furniture assembleable by the kit assembly 10 according to the present invention may be selected from a wide variety of shapes and sizes, but in the first preferred embodiment of FIG. 1 is illustrated by a shelving arrangement.

The shelving arrangement includes a first plurality of elongate and vertically extending supports arranged in spaced apart fashion. Specifically, a first support 12, a second support 14, a third support 16 and a fourth support 18 are established in a generally rectangular and spaced apart fashion. In the preferred embodiment, each of the vertically extending supports 12, 14, 16 and 18 are substantially square shaped in cross section and include a first pair of spaced apart faces and a second pair of spaced apart faces, such as are illustrated by first pair of spaced apart faces 20 and 22 and second pair of spaced apart faces 24 and 26 of vertical support 18 in the enlarged view of FIG. 2. Each of the vertical supports 12, 14, 16 and 18 include first and second pairs of spaced apart faces, only the faces 20, 22 and 24, 26 of support 18 being shown for ease of illustration, however it is not necessary that the faces be in parallel arrangement or that the cross section of the vertical support of be square shaped. It is rather possible that any polygonal shaped cross sectional support, ranging from a triangle having three sides to a circle having an infinite number of sides may be employed without departing from the scope of the invention.

Referring again to FIGS. 1 and 3, a first plurality of apertured portions extend through the first selected pair of spaced apart faces and the second selected pair of spaced apart faces in individual alternating and longitudinally spaced fashion. Referring again to FIG. 3, a first selected aperture 28 is illustrated extending through the first pair of spaced apart faces 20 and 22, a second selected aperture 30 being spaced a longitudinal distance along the vertical support 18 and extending in cross-wise fashion through the second pair of spaced apart faces 24 and 26 and a third selected aperture 32 being spaced a yet further longitudinal distance along the support 18 and extending again through the first pair of spaced apart faces 20 and 22. Each of the apertures illustrated at 28, 30 and 32, as well as all the corresponding apertures through the vertical supports 12, 14, 16, 18, are substantially rectangular shaped in cross section. Referring to the enlarged view of FIG. 3, the rectangular shaped aperture 28 of vertical support 18 is illustrated in somewhat enlarged fashion and includes a first rounded corner 34, a second rounded corner 36, a third rounded corner 38 and a fourth rounded corner 40, each of the corners exhibiting a selected radius of curvature.

A second plurality of apertured portions are illustrated and include first and second spaced apart and circular cross sectional shaped apertures according to a first selected diameter and which communicate opposite exterior faces of the vertical supports with an associated and cross wise extending rectangular shaped aperture. Specifically, referring again to FIG. 2, second pairs of circular shaped apertures are illustrated at 42, 44 and 46 and correspond in reverse alternating fashion with the rectangular shaped apertures 28, 30 and 32 so that they extend in a cross wise manner and are arrayed in communicating fashion with the apertures 28, 30 and 32. Referring also again to FIG. 3, the pair of first and second spaced apart apertures 42 are illustrated in phantom within the vertical support 18 and are clearly illustrated in cross wise and communicating fashion relative to the rectangular shaped aperture 28. As is clearly illustrated in the drawings, the pluralities of first and second apertures are illustrated extending in alternating, spaced apart and cross wise arrayed fashion along the longitudinal lengths of each of the first 12, second 14, third 16 and fourth 18 vertical supports at selected spaced distances in identical fashion to the portions referred to in FIGS. 2 and 3. Therefore, not all of the first and second apertured portions have been enumerated for purposes of both ease and clarity of illustration.

Extending in horizontal and cross wise fashion relative to the vertically extending supports 12, 14, 16 and 18 are second pluralities of elongate cross members. Referring again to FIG. 1, a first plurality of horizontal and parallel spaced apart cross members are illustrated at 48, 50 and 52 extending between the first vertical support 12 and the fourth vertical support 18, a second plurality of cross members are illustrated at 54, 56, 58 and 60 extend between the first support 12 and the second support 14, a third plurality of cross members 62, 64 and 66 extend between the second support 14 and the third support 16 and, finally, a fourth plurality of cross members 68, 70, 72 and 74 extend between the third support 16 and the fourth support 18. The arrangement of the pluralities of cross members relative to the four vertical supports permits the assembling of the shelving display according to the first preferred embodiment as will be subsequently described in more detail.

Figure 2:
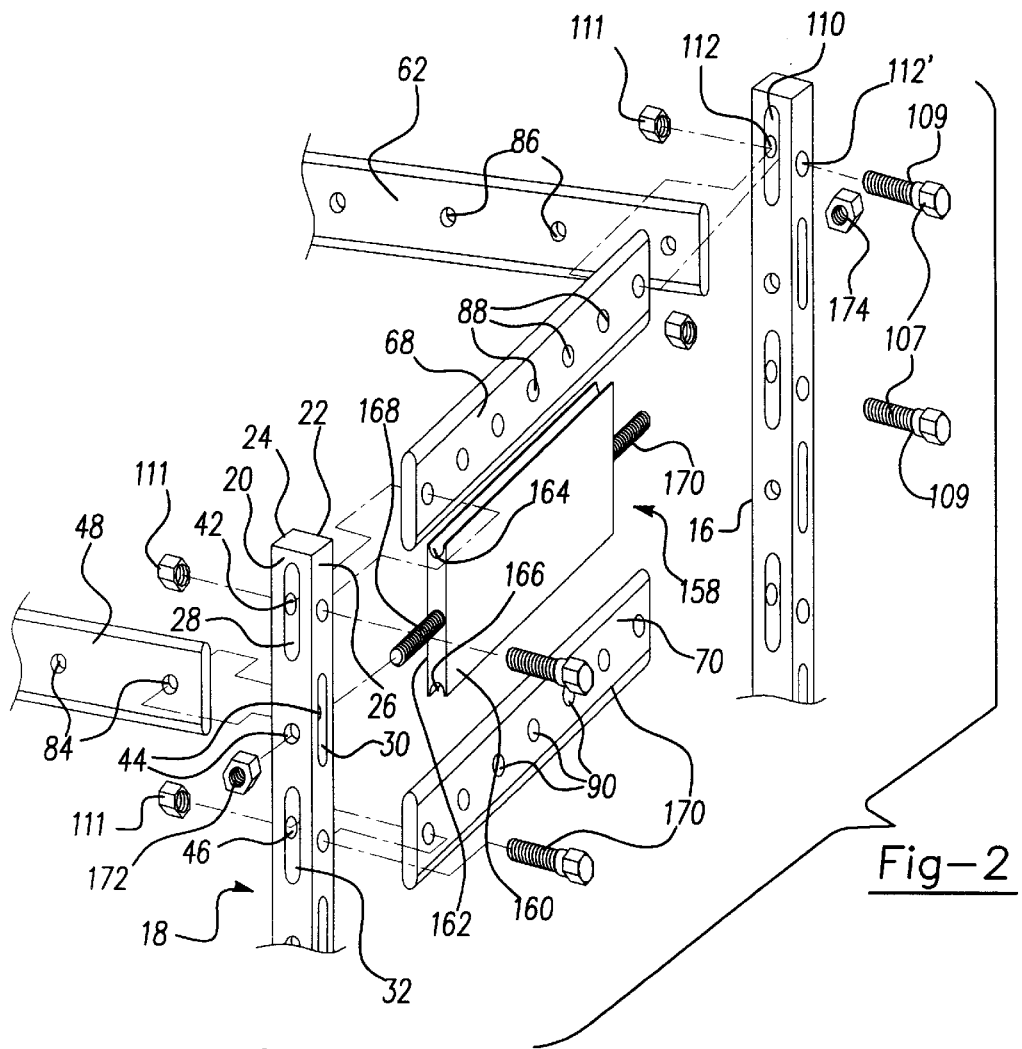
FIG. 2 is an exploded view illustrating an interconnecting engagement between a pair of vertical support members, a plurality of horizontal cross members and a horizontal enclosure member according to the preferred embodiment of the present invention.

Each of the horizontally extending cross members, and particularly illustrating the lengthwise extending cross members 48 and 62 and end extending cross members 68 and 70 shown in the enlarged and exploded view of FIG. 2, further include a substantially rectangular cross sectional shape which corresponds substantially in dimension to the cross sectional shape of a selected rectangular shaped first apertured portion, such as apertured portions identified at 28, 30 and 32. The substantially cross sectional shape of any selected cross member, such as cross member 68 also illustrated in FIG. 3 in inserted fashion through rectangular aperture 28 of vertical support 18, further includes a first rounded corner 76, a second rounded corner 78, a third rounded corner 80 and a fourth rounded corner 82 which correspond in arrangement to the corners 34, 36, 38 and 40 of the aperture 28 with the exception that they are selected according to a second and sharper radius of curvature as compared to the first radii of curvature of the corners 34, 36, 38 and 40. The cross sectional dimensions of the cross members are otherwise established in close dimensional tolerancing to the corresponding dimensions of the associated rectangular shaped apertures to facilitate easy cross wise insertion of the cross members through selected rectangular shaped apertures arrayed along the vertically extending supports.

Additional pluralities of generally circular cross sectional shaped apertures are formed through each of the cross members at selected and spaced apart distances and are illustrated as apertures 84 for cross member 48, apertures 86 for cross member 62, apertures 88 for end cross member 68 and apertures 90 for end cross member 70. For purposes of the present invention, it is only necessary to provide a number of apertures within a selected cross member which correspond to insertion points through selected vertical supports, however the provision of large pluralities of such apertures at equally spaced intervals increases the flexibility of design which is incorporated into the kit assembly and increases the overall attractiveness of its appearance.

Referring again to FIG. 3, the cross member 68 is illustrated in an end view insertion through the rectangular shaped aperture 28 of the vertical support 18 and the cross member 48 in a like cross wise insertion through the rectangular shaped aperture 30. The opposite ends of the cross members are inserted through the selected rectangular shaped apertures so that a selected aperture within a cross member, such as aperture 88 of cross member 68 shown in phantom in FIG. 3, is in general alignment with the pair of first and second spaced apart circular apertures, again shown by cross wise extending apertures 42 in the vertical support 18 which communicate with the rectangular shaped aperture 28.

Figure 3:
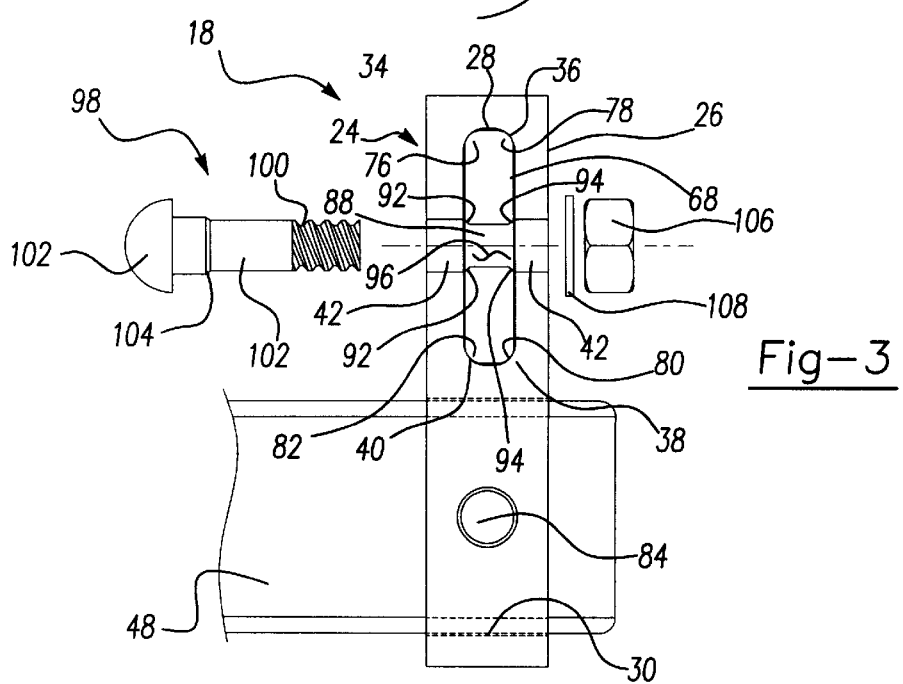
FIG. 3 is an enlarged sectional view of the cross wise extending and alternating first and second apertured portions which are arrayed in communicating fashion and also showing in exploded view a fastener assembly for fixedly securing a selected cross member to a vertical support according to the present invention.

The selected aperture 88 of cross member 68 presented in phantom in FIG. 3 is illustrated in the preferred configuration according to the present invention and establishes a substantially spool shaped design with a first annular shaped ledge 92 and a second annular shaped ledge 94 communicating with opposite faces of the cross member 68 and which extend inwardly and in angled fashion relative to the exterior faces of the cross member 68. A central interior and circular shaped aperture 96 communicates at opposite ends with the annular ledges 92 and 94 and is selected according to a second diameter which is less than the first selected diameter of the spaced apart circular apertures 42 which surround either side of the cross member aperture 88 and so that the annular ledges 92 and 94 form an inwardly angled and abutting step.

The secure and non-wobble or loose arrangement provided by the kit assembly of the present invention also contemplates the use of a plurality of individual fastener assemblies, such as are shown throughout the drawings. Referring again to FIG. 3, an example of the fastener assembly is identified includes a bolt 98 having a circular cross sectional shaft with a threaded end 100 and an enlarged head 102. An intermediate portion 103 of the shaft separated from the threaded end further includes an annular and outwardly angled step 104 which corresponds both in axial placement and in annular dimension with a selected inwardly angled step of an associated ledge of a spool shaped aperture so as to provide an abutting engagement between the bolt 98 and the selected cross member.

As is shown in FIG. 3, the outwardly angled step 104 of the intermediate portion 103 of the bolt 98 is configured so that, upon complete axial insertion of the bolt through the cross member aperture 88 and surrounding spaced apart pair of apertures 42 the outward step 104 of the bolt 98 is in abutting engagement with the selected inwardly angled annular ledge 92 of the cross member aperture 88. The fastener assembly illustrated in FIG. 3, as well as throughout the drawings, further includes an interiorly threaded nut 106 which is threadably engaged over an end of the threaded portion 100 of the bolt shaft which projects beyond an opposite face (face 26) of the vertical support 18 and an elastic and annular shaped lock washer 108 is sandwiched between the nut 106 and the face 26 of the support. The lock washer 108 is preferably either rubber or plastic in construction and provides a selected degree of resiliency and/or give during the tightening of the nut to assist in providing a secure and rotatively resistant engagement to the fastener assembly. The fastener assembly illustrated in the enlarged view of FIG. 3 is somewhat different in construction from the fastener assemblies shown throughout FIG. 2, and illustrated at 107, however it is understood that such fastener assemblies will adequately function provided the outwardly angled and annular step 109 is present for corresponding abutting engagement with the inwardly angled ledge portions of the associated cross member apertures throughout the kit assembly and the application of nut engaging portions 111.

Figure 5:
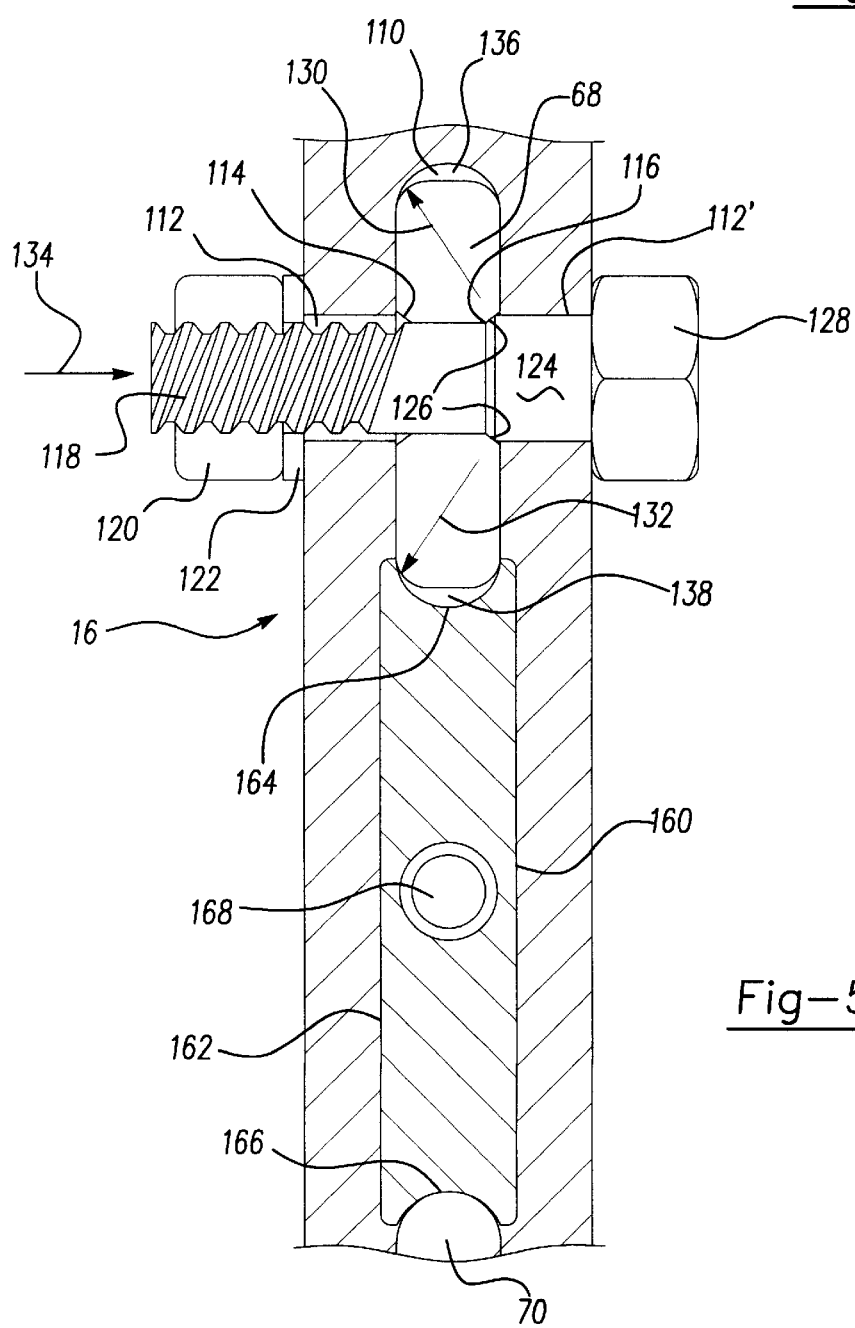
FIG. 5 is a cutaway view taken along line 5—5 of FIG. 1 and further illustrates the fixed engagement of a fastener such as is shown in the exploded array of FIG. 3 through a selected cross member and vertical support according to the present invention.

Concurrent with the above description of an exploded fastener assembly for securing a selected end of the cross member 68 to the vertical support 18, reference is now made to FIG. 5 which illustrates a like connection of a horizontal cross member and vertical support in engaged and interconnected fashion by a fastener assembly according to the present invention. FIG. 5 illustrates a rearwardly extending and opposite end of the cross member 68 in inserted fashion through a selected rectangular shaped aperture 110 of the third vertical support 16 of the shelving assembly and this can also be viewed from the illustration of FIG. 2.

The fastener assembly employed in the assembly of FIG. 5 differs somewhat from that illustrated in exploded fashion at 107 and 109 in FIG. 2 and includes a bolt with a shaft which projects through the cross wise spaced apart apertures 112 and 112' of the vertical support 16 which are arrayed cross wise relative to the substantially rectangular shaped aperture 110 as well as the centrally aligned aperture at the end of the cross member 68, which is largely obscured by the inserted bolt with the exception of the inwardly angled annular steps 114 and 116 at opposite faces thereof of the cross member. The threaded end 118 of the shaft which projects beyond the opposite face of the vertical support 16 is engaged by the threaded nut 120 and intermediately sandwiched lock washer 122.

Tightening of the threaded nut 120 results in an intermediate portion 124 of the bolt being drawn towards the aligned aperture portion of the cross member 68 such that an associated and outwardly stepped ledge 126 of the bolt is forced into an abutting contact with the inwardly angled and annular step 116 in the cross member aperture. An enlarged head portion 128 of the bolt is illustrated in substantially hexagonal shape and is illustrated in abutting engagement with the exterior surface of the vertical support opposite the threaded nut 120 and lock washer 122. However, the real engaging forces provided by the configuration of the vertical support, cross member and fastener bolt exist primarily at the location of the abutting contact between the annular step 116 of the aperture and the ledge 126 of the bolt.

Upon the tightening of the nut 120, the abutting annular shoulder or ledge 126 of the fastener against the annular step 116 causes a pair of angularly extending force vectors to be applied to the interiorly extending cross member 68 and are illustrated by force vectors 130 and 132 which extend in a generally 45 degree fashion relative the horizontal plane and which results from a generally 45 degree angular abutment between the surfaces 126 and 116. An additional and axially inwardly directed force vector 134 is illustrated which results from the tightening of the nut 120 and, in combination with the force vectors 130 and 132, creates a generally triangular force vector concentration which results in the primary holding forces of engagement being located at the interior connection between the cross member and vertical support and not at the exterior contacting surface of the enlarged head portion 128.

The ability to generate significant outwardly angled vector forces 130 and 132 from the location of annular abutment is aided by the cross sectional shaping of the corners of the inserting cross member with sharper radii of curvature as opposed to the corresponding corners of the rectangular shaped apertures. The existence of clearance between the corresponding edges of the cross member and the aperture of the vertical support, illustrated as upper clearance 136 and lower clearance 138, facilitates additional give in the cross member 68 during tightening of the nut 120 and helps to locate additional forces within the interior of the vertical support. It is also contemplated that the angle of abutment of the annular and inwardly angled ledges of the cross member aperture and the corresponding outwardly stepped ledges of the inserted fastener can be modified in any desired fashion, such as at 30 degrees from the horizontal or 60 degrees from the horizontal to adjust the generated force vectors resulting from the abutting contact and without departing from the scope of the invention.

The fastener construction described in detail in FIG. 5 is applied to each and every connection between a selected inserting end of a cross member and an associated rectangular shaped aperture of a vertical support through which the cross member is to be inserted. In this fashion, the kit assembly of the present invention permits the construction of a specified article of furniture and which continues to demonstrate the ability of versatile assembly.

Figure 4:
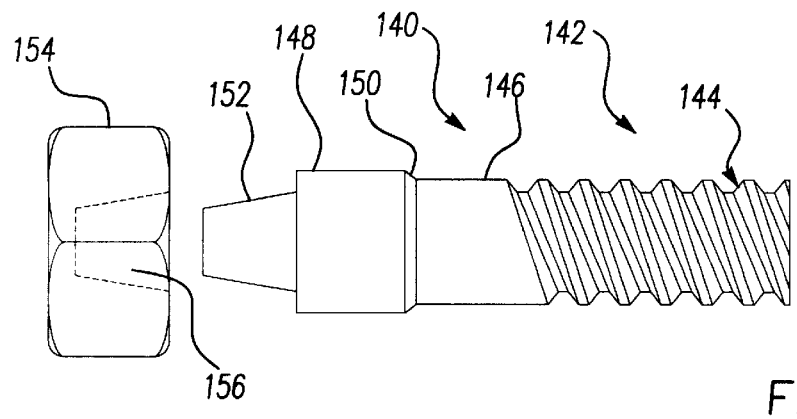
FIG. 4 is a partial view of a fastener according to a further preferred embodiment of the present invention.

Referring to FIG. 4, an alternative variant of a fastener bolt assembly is shown at 140 and includes a shaft portion 142 with a threaded end portion 144, a smooth portion 146, an intermediate portion 148 defined by an outwardly annular and stepped ledge 150 and a projecting end 152. A hex head portion 154 with an interiorly configured cavity 156 is provided and, upon applying an adhesive (not shown) to both the interior cavity 156 and the projecting end 152, the projecting end 152 may be inserted within the cavity 156 and securably affixed thereto upon the adhesive drying. The construction of FIG. 4 is advantageous in assembling wooden fastener assemblies which can correspond to wooden construction of the vertical supports and horizontal cross members. It is also contemplated that either or both the fastener assemblies and interconnecting vertical supports and cross members can be constructed from lightweight metal, metal turbing or artificial materials, however wooden construction is contemplated at the primary preferred embodiment.

Referring again to FIG. 2, a third plurality of horizontally extending enclosure members are provided for securing to the vertically extending supports in alternating fashion relative to the horizontally extending cross members. Only a single enclosure member 158 is shown in FIG. 2, however it is understood that a plurality of such members may be provided in alternating spaced nature between the cross members 68 and 70, as well as between the horizontally extending and spaced apart cross members throughout the shelving construction. As can be seen both in the exploded view of FIG. 2 and the side cutaway view of FIG. 5, the enclosure member 158 includes a first generally planar face 160 and a second generally planar and spaced apart face 162 which define an upper and longitudinally extending channel 164 and a lower and corresponding longitudinally extending channel 166.

Additional fasteners in the form of laterally projecting threaded bolt fasteners 168 and 170 extend in exploded fashion from opposite ends of the enclosure member 158 and, upon the selected member being inserted through selected circular cross sectional shaped apertures in the vertical supports 18 and 16, are threadably engaged at one end through internally threaded recesses 172 and 174 formed in the ends of the member 158 and at the other ends are securably engaged by the fasteners 168 and 170 additional tightening nuts 172 and 174 to the vertical supports 16 and 18. As is again best shown in FIG. 5, the recess channel construction illustrated at 164 and 166 corresponds nicely with the rounded upper and lower longitudinally extending edges of the cross members 68 and 70 to give the engagement an attractive enclosed appearance. It is also evident that additional horizontal enclosure members can be provided exhibiting any desired dimensions for enclosing a desired article of furniture and an additional example of such a construction will be subsequently illustrated with reference to FIG. 7.

Referring again to FIG. 1, additional supporting structure for the shelving assembly constructed according to the kit assembly of the present invention is shown and includes elongated and circular cross sectional supports 176 which extend between selected cross members, in this instance cross members 48 and 62, and which are secured to the cross members by additional fasteners 178. The extending supports 176 facilitate the placement of a planar shaped platform 180 upon two or more selected cross members, such as is shown supported upon cross members 50 and 64 in FIG. 1.

Figure 6:
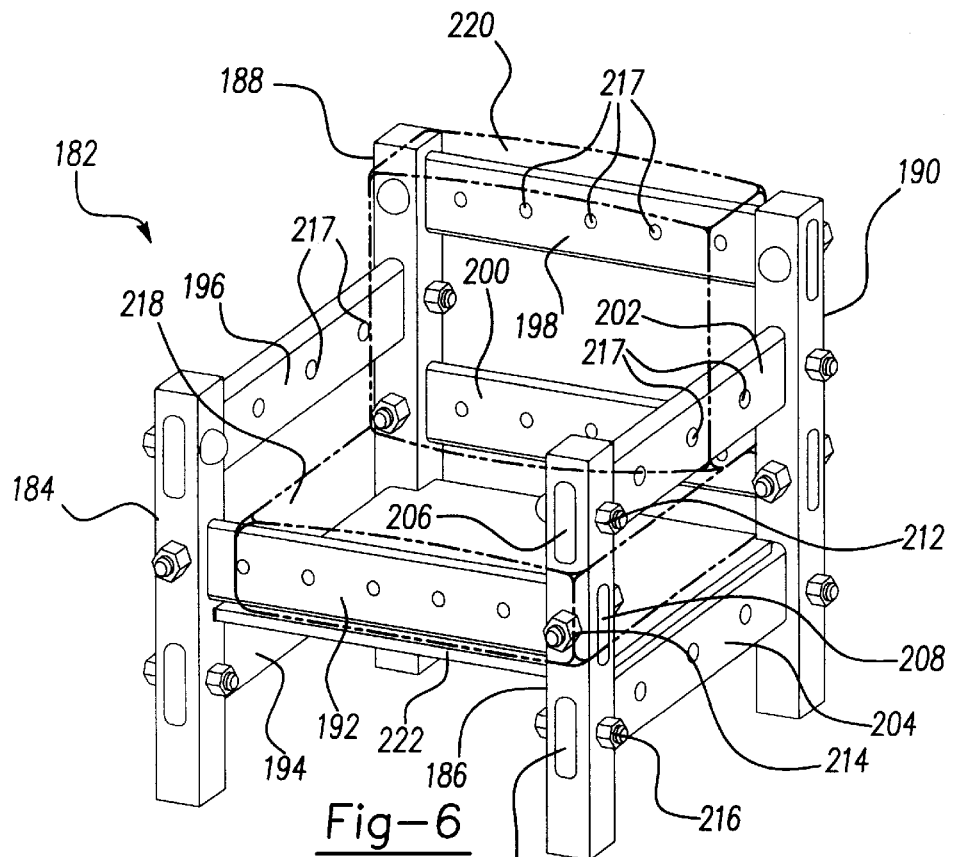
FIG. 6 is a perspective view of a kit assembly for constructing an article of furniture according to a second preferred embodiment of the present invention.

Referring to FIG. 6, a further example of an article of furniture 182 is illustrated which is assembled by a kit assembly according to the present invention. The article of furniture 182 is a conventional chair and, similar to the construction of the shelving assembly in the first preferred embodiment, includes a first vertically extending support 184, a second vertically extending support 186, a third vertically extending support 188 and a fourth vertically extending support 190. As shown in FIG. 6, the first and second supports 184 and 186 are shorter forward supports which correspond to forward legs of the chair and the third and fourth supports 188 and 190 are taller rearward supports which correspond to combined rearward legs of the chair as well as a back support.

A plurality of cross members are again provided for engaging with the vertical supports and include a cross member 192 secured between the first and second supports 184 and 186, a first cross member 194 and a second spaced cross member 196 secured between the first and third supports 184 and 188, a first cross member 198 and a second spaced cross member 200 secured between the third and fourth supports 188 and 190 and, finally, a first cross member 202 and a second spaced cross member 204 secured between the fourth and second supports 190 and 186.

The vertically extending supports 184, 186, 188 and 190 have the alternating first rectangular shaped recesses, such as illustrated at 206, 208 and 210 for support 186, and a second pair of circular shaped recesses which extend in cross wise and communicating fashion with respect to the rectangular shaped recesses and which are hidden from view by the installation of the fastener assemblies 212, 214 and 216 through corresponding aligning apertures 217 in the cross members. The manner in which the fastener assemblies secure the cross members to the support members is identical in every respect to that described in detail in the first preferred embodiment, therefore additional explanation is unnecessary. Also illustrated in phantom are a seat cushion 218 and an upright back cushion 220 which can be used with the construction 182 of FIG. 6 and an additional platform support 222 is illustrated for providing support to the underside of the seat cushion 218 and sets upon upper edges of the cross members 194 and 204.

Figure 7:
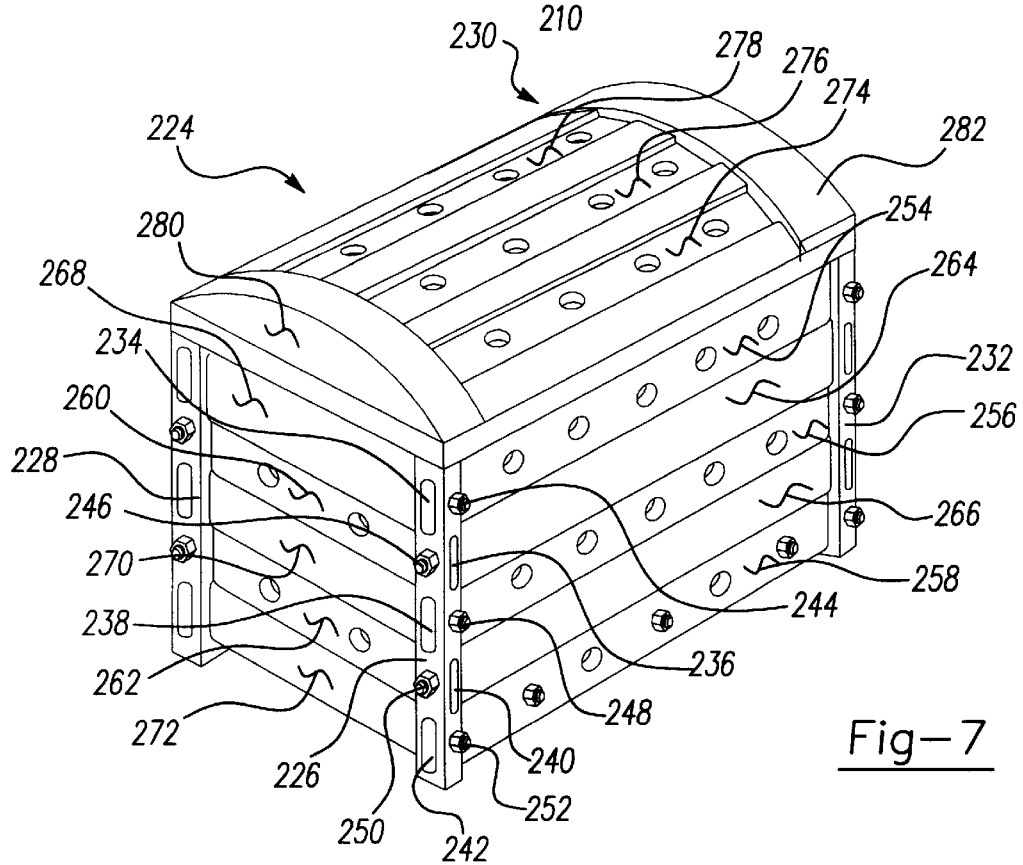
FIG. 7 is a perspective view of a kit assembly for constructing an article of furniture according to a third preferred embodiment of the present invention.

Referring to FIG. 7, a yet further example of an article of furniture is shown in perspective at 224 which is capable of being constructed by the kit assembly of the present invention and is of a toy chest configuration. A first vertical support 226, a second vertical support 228, a third vertical support (hidden from view but identified at 230) and a fourth vertical support 232 are arranged in spaced apart fashion and each include the first plurality of spaced apart and rectangular shaped apertures, see apertures 234, 236, 238, 240 and 242 in first support 226. Cross wise extending and alternating communicating apertures are likewise illustrated in obscured fashion due to the fastener assemblies 244, 246, 248, 250 and 252 which are installed in place and which likewise secure corresponding ends of selected cross members through an end aperture in each of the cross members.

Specifically, spaced apart cross members 254, 256 and 258 secure in part at a selected end to the vertical support 226 by fastener assemblies 244, 248 and 252, respectively. Additional cross members 260 and 262 secure in part at further selected ends to the vertical support 226 by fastener assemblies 246 and 250. Additional enclosure members are provided at 264 and 266 in alternating fashion between the cross members 254, 256 and 258 and still further enclosure members are provided at 268, 270 and 272 in alternating fashion relative the cross members 260 and 262. The enclosure members secure to the vertical supports in the same fashion as previously described in FIGS. 2 and 5 and, in combination, provide an enclosed four sided base to the toy chest 224. A lid to the toy chest is constructed of additional spaced apart cross members 274, 276 and 278 which secure at opposite ends thereof to arcuate shaped ends 280 and 282 and the lid may be pivotally and hingedly connected to the enclosed base in any conventional fashion. Also, as with the earlier preferred embodiments, the configuration and assembly of the fastener assemblies and the apertured portions in the vertical supports and cross members are identical to that described in the first preferred embodiment for constructing an article of furniture with greatly increased strength and versatile assembly.

Figures 8, 9, 10:
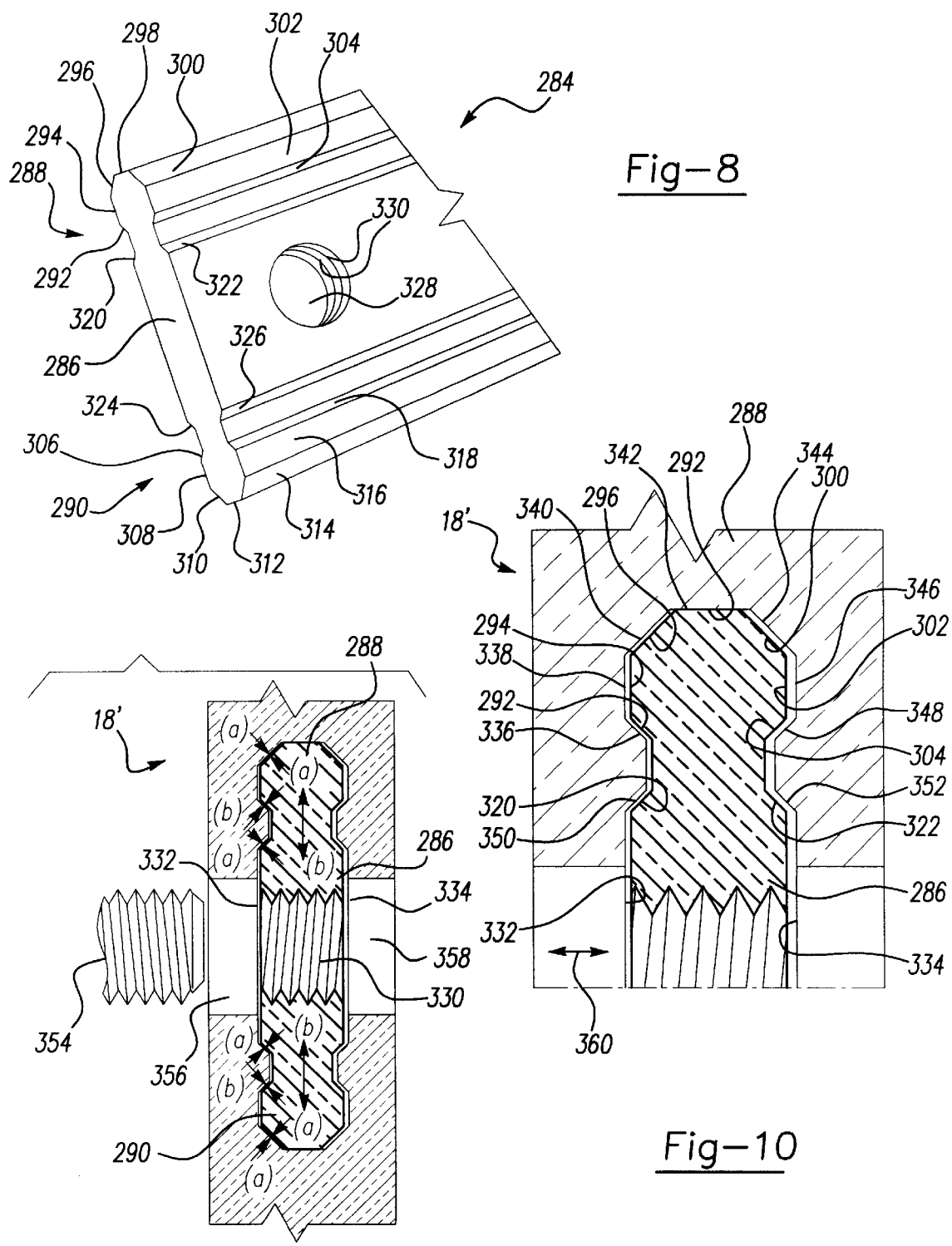
FIG. 8 is a partial view of a selected horizontal cross member according to a further preferred variant of the present invention.
FIG. 9 is a partial end view of an interconnecting engagement between a selected vertical support with crosswise extending first and second apertures and an inserting horizontal cross member with an aligning second aperture.
FIG. 10 is an enlarged view of the interconnecting engagement shown in FIG. 9 and illustrating in more detail the contraction/expansion absorption capabilities of the kit assembly for preventing wobble over extended time according to the present invention.

Referring now to FIG. 8, a partial illustration is shown in perspective at 284 of a selected end of a specified horizontal cross member according to a further preferred variant of the present invention. The cross member 284 is similar in most functional aspects to those identified in the first preferred embodiment, with the exception that the substantially rounded edges of the cross members (as viewed in cross section in FIGS. 2 and 5) have been replaced by generally polygonal shaped upper and lower and axially extending ends.

Specifically, the cross member 284 as viewed in end view section includes a main body 286 which separates an upper axially extending and polygonal shaped end 288 from a likewise axially extending and lower polygonal shaped end 290. Each of the upper and lower polygonal ends 288 and 290 are configured with a multiple of sides, the upper end 288 including a first side 292, a second side 294, a third side 296, a fourth side 298, a fifth side 300, a sixth side 302 and a seventh side 304 and the lower end 290 including a first side 306, a second side 308, a third side 310, a fourth side 312, a fifth side 314, a sixth side 316 and a seventh side 318.

The polygonal shaped upper and lower ends 288 and 290 are separated from the main body 286 by upper and lower narrowed neck portions which are inwardly stepped relative to the main body and upper and lower ends and are defined by additional angled sides 320 and 322 of the main body opposite the sides 292 and 304 of the upper polygonal shaped end and additional angled sides 324 and 326 of the main body opposite the sides 306 and 318 of the lower polygonal shaped end 290. A generally circular shaped aperture 328 is illustrated extending cross wise through the horizontal member and in proximity to the selected end of the member 284 and is internally threaded as is evidenced by lines 330.

Referring to FIGS. 9 and 10, substantially identical end views are shown of the cross-wise engagement between the horizontal cross member 284 and an alternately configured vertical extending support 18'. The support 18' according to the further preferred variant includes a first aperture which is likewise configured in cross sectional fashion substantially identical to that evidenced by the end view of the cross member 284. Specifically, the aperture extending through the vertical support 18' in a cross wise direction includes a main body which corresponds substantially to the opposing sides of the cross sectional main body 286 of the horizontal member 284 and which is identified by sides 332 and 334. The first aperture in the vertical support 18' further includes upper and lower polygonal shaped ends which correspond substantially with the associated sides in the upper and lower ends 288 and 290 of the cross member. Specifically, as is best shown in FIG. 10, the upper end of the vertical support aperture is defined by a first side 336, a second side 338, a third side 340, a fourth side 342, a fifth side 344, a sixth side 346 and a seventh side 348. As is best shown in FIG. 9, the lower polygonal shaped end of the first aperture is identically configured to the upper end, and therefore the several sides are not identified for purposes of ease of clarification.

Upper and lower neck portions separate the corresponding upper and lower polygonal shaped ends from the sides 332 and 334 which define the main body portion of the first aperture. As is again best shown in FIG. 10, additional angled sides 350 and 352 form the initial inward step leading up from the main body of the first aperture and are in opposing arrayed fashion relative to the angled sides 320 and 322 of the corresponding horizontal member 284. Referring again to FIG. 9, an externally threaded shaft is illustrated at 354 (which forms part of a fastener assembly as previously described) is, upon mating engagement of the horizontal cross member within the first aperture of the vertical support 18' and alignment of the circular end aperture 328 of the cross member 284 with associated spaced apart pair of second apertures 356 and 358, threadably engaged through the internal threads 330 of the circular aperture 328. It is also worthy to note that no additional threads are necessary for placement along the adjoining spaced apart pair of second apertures 356 and 358, rather the threaded engagement of the shaft 354 through the internal threads 330 of the circular aperture 328 develop sufficient holding forces according to this preferred variant.

The enlarged view of FIG. 10, is illustrated in part to show the desired dimensioning of the end section of the cross member 284 so that it may be easily and slidably engaged through the corresponding first aperture of the vertical support. An additional and very important aspect of this configuration is that the spaced dimensioning established between the end section of the cross member and the adjoining surfaces defining the vertical support first aperture is capable of absorbing warpage and deflection of the wood construction in the interengaging members (as well as other types of expansion and shrinkage which may potentially occur both along and against the wood grains of the members 284 and 18') and most importantly in such a fashion that the anti-wobble nature of the interconnection is not compromised over time.

An explanation of the absorption effect provided by the interengaging configuration between the cross member end section and first aperture of the vertical support is best illustrated with reference once again to the end view of FIG. 9. Although the interengaging wooden members have the potential of expansion/contraction or other nature of warpage in any direction, a simple axis of contraction/expansion is illustrated in longitudinally extending directions (a) and (b) along the end section of the cross member and relative to the first aperture of the vertical support. Depending upon the direction of expansion/contraction of the cross member 284, selected pairs of opposing and interengaging sides between the cross member and vertical support will come into contact with one another so as to help ensure a minimal degree of wobble when the members expand or contact. Referring again to FIG. 10, it is also evident that the end section of the cross member can move laterally within the first aperture, as identified by directional arrow 360, and the polygonal configuration of the interengaging members is such that at least one or more pair or pairs of opposing and engaging surfaces will come into abutting contact, regardless of the direction of deflection of the cross member or vertical support. It is also understood that the polygonal configuration of the upper and lower ends of the cross members and first apertures in the vertical supports can be established with any given number of sides, particularly ranging from triangular on up and within the scope of the present invention.

It is therefore apparent that the present invention teaches a novel kit assembly for constructing articles of furniture and which does away with adhesives and other undesirable bonding agents in favor of the improved fasteners disclosed herein.

Having described my invention, additional embodiments will become apparent to those skilled in the art to which it pertains without deviating from the scope of the appended claims.

I claim:

1. A kit assembly for constructing an article of furniture, said kit assembly comprising:

a first plurality of elongate supports arranged in vertically extending and spaced apart fashion;

a second plurality of elongate and horizontally extending cross members;

first apertured means formed in said vertically extending supports for receiving opposite ends of said cross members in inserting fashion; and second apertured means formed in said vertically extending supports and at least in said opposite ends of said cross members, said second apertured means of said vertical supports and said horizontal cross members extending in cross wise and communicating fashion with respect to each of said first apertured means, each of said second apertured means formed in said cross members further including a spool shaped aperture which is arranged in alignment with the associated first and second spaced apart and circular cross sectional apertures in said vertically extending support, said spool shaped aperture being defined by annular ledges which extend in inwardly and angled fashion from opposite faces of said cross member, a central interior and circular shaped aperture communicating at opposite ends with said annular ledges and being according to a selected diameter which is less than a corresponding diameter of said spaced apart apertures so that said annular ledges form an inwardly angled and abutting step;

a fastener means being engaged through each of said first apertured means in said vertical supports and said aligned second apertured means in said vertical supports and said cross members for securably engaging said selected ends of said cross members to said vertical supports, said fastener means including a bolt having a shaft with an enlarged head at one end, a nut threadably secured to an opposite end of said shaft, rotatable tightening of said nut and bolt relative to one another causing first and second angularly extending force vectors to be applied to said interiorly extending cross members; and a triangular force vector concentration resulting from an additional and axially inwardly directed force vector created by the tightening of said nut in combination with the first and second angularly extending force vectors and which results in establishing a primary holding force of engagement located at the interior connection between said cross member and said vertical support as opposed to an exterior contacting surface of said enlarged head of said bolt.

2. The kit assembly for constructing an article of furniture as described in claim 1, each of said first plurality of elongate supports further comprising a substantially square shape in cross section with a first pair of spaced apart faces and a second pair of spaced apart faces, a plurality of said first apertured means extending through said first pair of spaced apart faces and said second pair of spaced apart faces in individual alternating and longitudinally spaced fashion, a plurality of said second apertured means likewise extending through said second pair of spaced apart faces and said first pair of spaced apart faces in longitudinally spaced and reverse alternating fashion.

3. The kit assembly for constructing an article of furniture as described in claim 2, each of said first apertured means further comprising a substantially rectangular cross sectional shaped aperture including first, second, third and fourth rounded corners according to a first selected radius of curvature.

4. The kit assembly for constructing an article of furniture as described in claim 3, each of said second plurality of cross members further comprising a substantially rectangular cross sectional shape corresponding substantially in dimension to said cross sectional shaped first apertured means, said substantially rectangular cross sectional shape of each said horizontally extending member including first, second, third and fourth rounded corners according to a second selected and sharper radius of curvature as compared to said first selected radius of curvature and permitting cross wise insertion of said opposite ends of said cross members within said vertical supports.

5. The kit assembly for constructing an article of furniture as described in claim 1, further comprising an elastic and annular lock washer being sandwiched between said nut and a selected face of said vertical support.

6. The kit assembly for constructing an article of furniture as described in claim 1, further comprising a third plurality of horizontally extending enclosure members which are secured to said first plurality of vertically extending supports in alternating fashion with respect to said second plurality of horizontally extending cross members, additional said fastener means extending axially from opposite ends of each of said third plurality of enclosure members.

7. The kit assembly for constructing an article of furniture as described in claim 1, said first plurality of vertically extending supports further comprising first, second, third and fourth elongate supports, said second plurality of horizontally extending cross members further comprising a first sub-plurality of cross members securably affixed between said first and second supports, a second sub-plurality of cross members securably affixed between said second and third supports, a third sub-plurality of cross members securably affixed between said third and fourth supports and a fourth sub-plurality of cross members securably affixed between said fourth and first supports.

8. The kit assembly for constructing an article of furniture as described in claim 7, further comprising a planar shaped platform capable of being supported upon at least first and second selected and horizontally aligned cross members.

9. The kit assembly for constructing an article of furniture as described in claim 2, each of said first apertured means further comprising a polygonal shaped aperture including a main body which separates an upper polygonal shaped end from a lower and corresponding polygonal shaped end.

10. The kit assembly for constructing an article of furniture as described in claim 9, each of said second plurality of cross members further comprising a main body in cross section which separates an upper polygonal shaped end from a corresponding lower and polygonal shaped end, said cross section of each of said cross sectional members capable of being slidably engaged through said first apertures and so that selected pairs of opposing sides established between said cross member and said first aperture come into an abutting engagement depending upon any deflection occurring between said cross members and said vertical supports.

11. A kit assembly for constructing an article of furniture, said kit assembly comprising:

a first plurality of elongate supports arranged in vertically extending and spaced apart fashion;

a second plurality of elongate and horizontally extending cross members;

first apertured means formed in said vertically extending supports for receiving opposite ends of said cross members in inserting fashion, each of said first apertured means further including a substantially rectangular cross sectional shaped aperture including first, second, third and fourth rounded corners according to a first selected radius of curvature, each of said second plurality of cross members further including a substantially rectangular cross sectional shape corresponding substantially in dimension to said cross sectional shaped first apertured means, said substantially rectangular cross sectional shape of each said horizontally extending member including first, second, third and fourth rounded corners according to a second selected and sharper radius of curvature as compared to said first selected radius of curvature and permitting cross wise insertion of said opposite ends of said cross members within said vertical supports;

second apertured means formed in said vertically extending supports and at least in said opposite ends of said cross members, said second apertured means of said vertical supports and said horizontal cross members extending in cross wise and communicating fashion with respect to each of said first apertured means, each of said plurality of elongate supports further including a substantially square shape in cross section with a first pair of spaced apart faces and a second pair of spaced apart faces, a plurality of said first apertured means extending through said first pair of spaced apart faces and said second pair of spaced apart faces in individual alternating and longitudinally spaced fashion;

a plurality of said second apertured means likewise extending through said second pair of spaced apart faces and said first pair of spaced apart faces in longitudinally spaced and reverse alternating fashion, each of said second apertured means formed in said vertically extending supports further including first and second spaced apart and circular cross sectional shaped apertures according to a first selected diameter and communicating opposite exterior faces of said vertical supports with an associated and cross wise extending rectangular shaped aperture;

each of said second apertured means formed in said cross members further including a spool shaped aperture which is arranged in alignment with said associated first and second spaced apart and circular cross sectional shaped apertures in said vertically extending support, said spool shaped aperture being defined by annular ledges which extend in inwardly and angled fashion from opposite faces of said cross member, a central interior and circular shaped aperture communicating at opposite ends with said annular ledges and being according to a second selected diameter which is less than said first selected diameter of said spaced apart apertures so that said annular ledges form an inwardly angled and abutting step;

a fastener means being engaged through each of said first apertured means in said vertical supports and said aligned second apertured means in said vertical supports and said cross members for securably engaging said selected ends of said cross members to said vertical supports, said fastener means further including a bolt having a circular cross sectional and threaded shaft and an enlarged head, said enlarged head further including a hexagonal shape with an inner cavity, a projecting end of said shaft being axially inserted within said inner cavity and adhesively affixed to said hex head, an intermediate portion separating said threaded shaft from said enlarged head and being defined by an annular and outwardly angled step which corresponds both in axial placement and in annular dimension with a selected inwardly angled step of an associated spool shaped aperture so as to provide abutting engagement between said fastener bolt and said cross member upon engagement of said bolt.

* * * * *